Nov. 12, 1946.                R. BLACK. JR                2,410,805
                            VIBRATION DETECTOR
                            Filed Jan. 16, 1942
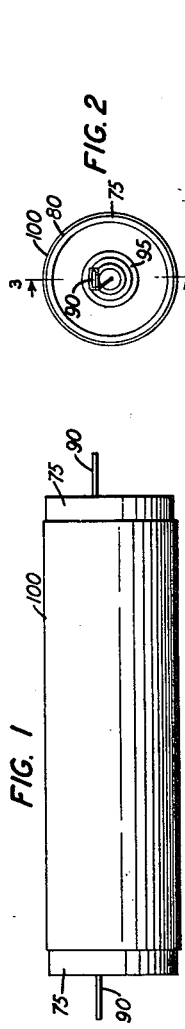
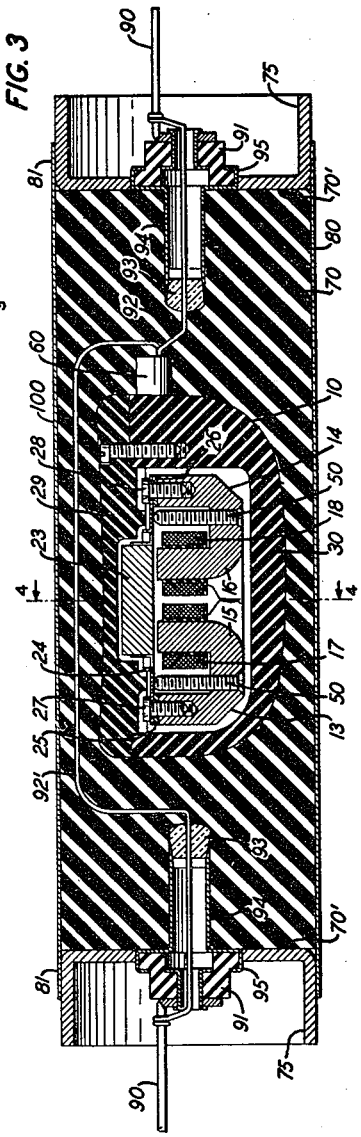
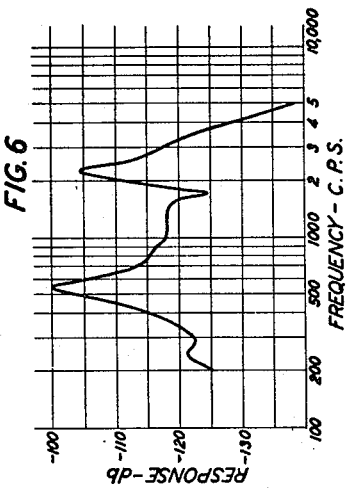
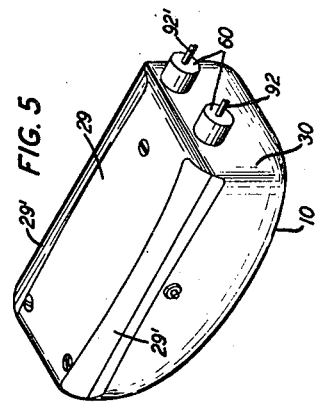
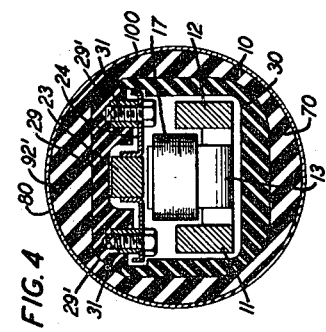
INVENTOR
R. BLACK, JR.
BY
Robert J. Pluskey
ATTORNEY Patented Nov. 12, 1946

2,410,805

UNITED STATES PATENT OFFICE 2,410,805

VIBRATION DETECTOR

Robert Black, Jr., South Orange, N. J., assignor to Bell Telephone Laboratories, Incorporated, New York, N. Y., a corporation of New York Application January 16, 1942, Serial No. 426,989

3 Claims. (Cl. 177—386)

This invention relates to vibration detectors and, more particularly, to such detectors used in a liquid medium, for example, water, in the detection of noises, signal waves or other underwater disturbances.

An object of the invention is to provide an inexpensive, small and efficient detector of underwater vibrations.

Another object is to detect efficiently underwater vibrations with an inertia-type transducer, device or unit.

A feature of the invention comprises completely surrounding an electromechanical transducer, device or unit for use in a liquid medium, such as water, with a body of flexible, elastic or resilient material.

Another feature comprises detecting underwater vibrations with an inertia-type device or unit embedded in a body of flexible, elastic or resilient material, such as a soft rubber, intimately adherent to the unit.

A further feature comprises an arrangement for protecting the detector unit against water diffusion through the elastic body in which it is embedded.

In accordance with the invention, an inertia-type electromechanical transducer, device or unit is embedded in a body of flexible, elastic or resilient material, such as a soft rubber. The transducer preferably comprises a container or case of relatively inflexible material to the outer surface of which the elastic material is intimately adherent. The body of flexible material may have a geometrically symmetrical outer surface and, in a preferred embodiment, this outer contour may be cylindrical in character. Terminal members are supported at the ends of the cylindrical body, and conductors are embedded in the elastic material for connecting the transducer with the terminals. In order to protect the transducer against the effect of possible water diffusion through the elastic body, the latter is enclosed in a thin metallic sleeve or shield, the ends of which project beyond the ends of the elastic body whereby rigid, cup-shaped metallic members may be attached thereto. The electromechanical transducer may be an inertia-type bone conduction receiver such as has been disclosed in M. S. Hawley Patent No. 2,202,906 of June 4, 1940.

Other objects and features of this invention will be evidenced by, and a more complete understanding of it will be derived from, the detailed description that follows, taken in conjunction with the showing of the appended drawing, wherein:

Fig. 1 is a side view of a vibration detector embodying the invention;

Fig. 2 is an end view of the device of Fig. 1;

Fig. 3 is a cross-sectional view, enlarged, of the device of Figs. 1 and 2 taken along the lines 3—3 of Fig. 2;

Fig. 4 is another cross-sectional view of the device of Figs. 1 and 2 taken along the lines 4—4 of Fig. 3;

Fig. 5 is a view in perspective of the inertia-type transducer, device or unit incorporated in the device of Figs. 1 and 2; and Fig. 6 illustrates the response characteristic of the device of Figs. 1 to 5 for vibrations incident normal to the cylindrical surface thereof.

The vibration detector 100 of Figs. 1 to 5 is intended and adapted for the detection and translation into an electric current of submarine signaling waves or other under-water disturbances or vibrations. It embodies an inertia-type electromechanical transducer, device or unit substantially the same as the telephonic device disclosed in M. S. Hawley United States Patent No. 2,202,906 of June 4, 1940, the principal differences being that the device 10 herein includes a pair of set screws 50 threading through the pole-pieces 13, 14 and bearing at their rounded ends on the spider member 24 to enable adjustment of the air-gap between the armature 23 and the pole faces of the arms 15, 16 of the pole-pieces; and in that the long or longitudinal edges 29' of the cover 29 of the unit 10 herein, slope or are contoured at an angle of approximately 45 degrees with respect to the outer surface of the cover. More specifically, the device 10 herein comprises a pair of bar permanent magnets 11, 12; a pair of U-shaped pole-pieces 13, 14 whose inner arms 15, 16 are surrounded by and support current coils 17, 18; an armature 23 fastened to and supported by a spider member 24, the spider member being secured to the outer arms of the pole-pieces by screws 27, 28, spacer members or washers 25, 26 being interposed between the spider member and the pole-pieces. The magnet structure and the spider are enclosed by a case or container comprising casing 30 of relatively inflexible material such as a plastic, and a cover member 29 of similar material, being fastened to and supported solely by the cover member, the fastening means comprising screws 31 threading into tapped bushings embedded in the cover. The coils 17, 18 may be connected in series, their free ends being brought out to spring terminals adapted to be engaged by pin or plug connectors 60. The device 10 is embedded in and completely surrounded by a body 70 of flexible, elastic or resilient material, such as a soft rubber, the body 70 being of an elongated, geometrically symmetrical configuration, in the particular embodiment, cylindrical in outer contour with planar ends 70'. The elastic material may be such that the product of its density and the velocity of propagation through it is substantially equal to that of the liquid medium in which the device 100 is to be used. The material of the body 70 is intimately adherent to the relatively inflexible casing and cover of the device 10, being vulcanized therearound. The elastic body is enclosed in a thin metallic shield or sleeve 80 whose end portions 81 project beyond the planar ends of the elastic body. This shield may be of electrotinned brass approximately .005 inch in thickness. Relatively rigid cup-shaped metallic members 75 are inserted within the projecting ends of the sleeve, are fastened thereto, for example, by solder, and bear against the planar ends of the elastic body. A terminal member 90 is supported on an insulator member 91 at each end of the elastic body, and is connected by a bare wire or conductor 92, 92' with the plug or connectors 60. The wires 92, 92' are brought out to their respective terminals through a glass bead 93 supported in the tapered end of a copper sleeve 94, the enlarged end 95 of which is spun over to firmly grip the insulator member 91, and is soldered to the member 75. The glass bead-copper sleeve provides a water-tight seal for the conductors, the elastic body being intimately adherent to the outer surfaces of the glass bead and copper sleeve.

It will be observed that the unit 10 is a substantially regular geometrical body of relatively greater length than either width or thickness, and that the elastic body is of substantially regular geometrical configuration of considerably greater length than diameter, the lengthwise dimension extending in the same direction as the lengthwise or longitudinal dimension of the device 10, with the thickness of the elastic body material along the long or lateral surfaces of the unit 10 being small compared to the elastic body material thickness at the ends of the device 10.

When the vibration detector described is submerged in a liquid medium, the sleeve 80 protects the device 10 against water diffusion through the elastic body. The sleeve 80 also acts to transmit signal waves, vibrations or other disturbances incident thereon to the device 10 through the material of the elastic body. The vibrations so transmitted will vibrate the device 10, and the relative movement of the armature 23 and the pole-pieces 13, 14 will result in a variation in the reluctance of the magnetic circuit constituted by the permanent magnet, pole-pieces and armature, which variation in reluctance causes a variation in the magnetic flux in the circuit, whereby currents corresponding to the vibration are induced in the coils 17, 18. These currents may be detected by suitable indicating or recording equipment (not shown) connected through suitable conductors with the terminals 90. For vibrations, waves or disturbances originating from the directions faced by the cylindrical surface of the vibration detector, the response characteristic will have the general shape shown in Fig. 6. The vibration detector was located at a depth of ten feet in water of temperature about 38° F. The abscissa is in cycles per second, the ordinate is open circuit voltage at the terminals in decibels down from one volt per dyne per square centimeter. The signal source was at a distance of one foot. The device 100 discriminates against waves, vibrations or disturbances originating from a direction faced by the ends of the elastic body.

The vibration detector described with reference to the appended drawing may be included with a plurality of similar vibration detectors in a cable included in a submarine signal or vibration detecting or locating system. A specific vibration detector constructed in accordance with this invention was quite small and compact being of the order of less than one inch in outer diameter and approximately three inches in length.

Although this invention has been disclosed with reference to a specific embodiment thereof, it will be evident that it is not limited thereto, but is of a scope evidenced by the appended claims.

What is claimed is.

1. A vibration detector comprising a unitary assembly comprising a container including a hollow case of relatively inflexible material and a cover of similar material for said case, and an electromechanical transducer within said case and supported solely from said cover, and a body of soft rubber completely enclosing said container and intimately adherent to the outer surfaces of said case and cover.

2. A vibration detector comprising an inertia-type electromechanical transducer including a case of relatively inflexible material, a body of relatively flexible material completely surrounding said case and intimately secured thereto, said body having a cylindrical outer contour, a thin metallic sleeve attached to and surrounding said body, a relatively rigid cup-shaped member at each end of said body secured to the latter and fitting within the ends of said sleeve, a terminal member within each of said rigid members, and conductors embedded in said body and connecting said transducer with said terminals.

3. A vibration detector comprising an inertia type electromechanical transducer including a case of relatively inflexible material, a body of relatively flexible material completely surrounding said case and intimately secured thereto, a thin metallic sleeve attached to and surrounding said body, a relatively rigid, closure member at each end of said body secured to the latter and fitting within the ends of said sleeve, a terminal member attached to each of said rigid members, and conductors embedded in said body and connecting said transducer with said terminal.

ROBERT BLACK, Jr.